US006209697B1

(12) United States Patent
Austin

(10) Patent No.: US 6,209,697 B1
(45) Date of Patent: Apr. 3, 2001

(54) SMALL DIAMETER WHEEL WITH OVERRUNNING CLUTCH ASSEMBLY

(75) Inventor: Scott D. Austin, Painted Post, NY (US)

(73) Assignee: The Hilliard Corporation, Elmira, NY (US)

( * ) Notice: Subject to any disclaimer, the term of this patent is extended or adjusted under 35 U.S.C. 154(b) by 0 days.

(21) Appl. No.: 09/353,845

(22) Filed: Jul. 15, 1999

(51) Int. Cl.$^7$ ................................................ F16D 41/066
(52) U.S. Cl. .......................... 192/45; 192/48.92; 192/50; 301/105.1
(58) Field of Search ................. 192/45, 48.92, 192/50; 56/11.8; 301/105.1

(56) References Cited

U.S. PATENT DOCUMENTS

| | | |
|---|---|---|
| 76,328 | 4/1868 | Johnson et al. . |
| 1,375,576 | 4/1921 | Duca ..................................... 192/44 |
| 1,443,248 | 1/1923 | Defordt . |
| 1,465,486 | 8/1923 | Sandiford ............................. 192/44 |
| 2,300,223 | 10/1942 | Hottenroth, Jr. ...................... 192/45 |
| 2,699,238 | 1/1955 | Sampatacos et al. ................ 192/45 |
| 2,811,232 | 10/1957 | Seidel .................................. 192/44 |
| 2,919,000 | 12/1959 | Claytor ................................ 192/44 |
| 2,926,765 | 3/1960 | Heid .................................... 192/45 |
| 3,054,488 | 9/1962 | General et al. ...................... 192/44 |
| 3,184,020 | 5/1965 | Benson et al. ...................... 192/45 |
| 3,221,850 | 12/1965 | Bacon .................................. 192/45 |
| 3,247,727 | 4/1966 | Digby et al. ........................ 192/45 |
| 3,487,900 | 1/1970 | Dahl .................................... 192/27 |
| 3,537,555 | 11/1970 | Reister ................................. 192/45 |
| 3,732,957 | 5/1973 | McEwen .............................. 192/45 |
| 3,750,782 | 8/1973 | Constantini et al. ................ 192/45 |
| 4,266,642 | 5/1981 | Mazzorana ........................... 192/45 |
| 4,554,780 | * 11/1985 | Umeno et al. ....................... 56/11.8 |
| 4,720,001 | * 1/1988 | Jensen ................................. 192/50 X |
| 4,770,279 | 9/1988 | Shiozaki et al. ..................... 192/45 |
| 4,785,612 | * 11/1988 | Morishita et al. ................ 56/11.8 X |
| 4,986,140 | 1/1991 | Morishita et al. .................... 74/7 C |

(List continued on next page.)

FOREIGN PATENT DOCUMENTS

| | | |
|---|---|---|
| 330246 | 3/1958 | (CH) . |
| 850100 | 7/1947 | (DE) . |
| 2134618 | 1/1973 | (DE) . |
| 3829 756 | 8/1990 | (DE) . |
| 1121078 | 7/1956 | (FR) . |
| 1242825 | 8/1970 | (GB) . |
| 2144498 | 3/1985 | (GB) . |
| 592263 | 4/1959 | (IT) . |
| 60-188630 | 9/1985 | (JP) . |
| 63-199935 | 8/1988 | (JP) . |

OTHER PUBLICATIONS

"Magna Torque (MT) Overrunning Clutches and Clutch Couplings" Brochure, The Hilliard Corporation, dated May 1998.

Primary Examiner—Richard M. Lorence
(74) Attorney, Agent, or Firm—Seidel, Gonda, Lavorgna & Monaco, PC

(57) ABSTRACT

A small diameter plastic eel with an overrunning clutch assembly mounted to the hub of the wheel. The wheel designed to be used with self-propelled power equipment operating at less than 1000 RPM. The overrunning clutch includes a clutch housing of generally annular cross-section having an outer periphery and an inner periphery. The housing has a radial stiffness which prevents deformation of the housing during use. The housing has recesses spaced equidistantly thereabout. Each recess has a throat opening, an outer wall, and a pair of side walls. A roller bearing is located in each of the recesses. One of the side walls has a concave surface. The other side wall has a spring for engaging the roller bearing and biasing the roller bearing toward the concave surface of the side wall.

32 Claims, 4 Drawing Sheets

U.S. PATENT DOCUMENTS

| | | | |
|---|---|---|---|
| 4,986,402 | 1/1991 | Neuwirth et al. | 192/45 |
| 4,989,704 | 2/1991 | Morishita et al. | 192/45 |
| 4,989,705 | 2/1991 | Kashio et al. | 192/45 |
| 4,995,489 | 2/1991 | Lederman et al. | 192/45 |
| 4,995,490 | 2/1991 | Kanai | 192/45 |
| 5,024,308 | 6/1991 | Kinoshita et al. | 192/41 A |
| 5,176,232 | 1/1993 | Malecha | 192/45 |
| 5,211,274 | 5/1993 | Milano, Jr. et al. | 192/45 |
| 5,274,987 * | 1/1994 | Wiener | 192/50 X |
| 5,318,160 | 6/1994 | Oomi et al. | 192/45 |
| 5,328,012 | 7/1994 | Takata | 192/45 |
| 5,715,664 * | 2/1998 | Sallstrom et al. | 56/11.8 X |

* cited by examiner

SMALL DIAMETER WHEEL WITH OVERRUNNING CLUTCH ASSEMBLY

FIELD OF THE INVENTION

This invention generally relates to an overrunning clutch and, more particularly, to an overrunning clutch for a small diameter wheel.

BACKGROUND OF THE INVENTION

Many types of small-wheeled, self-propelled devices are burdened by limitations caused by the ongoing tension between optimal performance and economic cost. Too often performance is sacrificed to lower costs, and the result is an inferior product. Taking the opposite approach and sacrificing low cost for optimal performance, however, often leads to poor sales because customers are not willing to accept disproportionately higher prices. A better situation, therefore, is one in which performance is increased with only a slight cost increase. In this situation, customers are more willing to accept a marginally higher price to buy a better product. Still better situations arise when performance increases and costs remain the same or decrease.

An example of small-wheeled devices where customers routinely consider costs and benefits is walk-behind power equipment. Many forms of this equipment that were once solely push-propelled more and more are becoming self-propelled. Examples of such equipment are lawnmowers, lawn vacuums, snow throwers, flexible line trimmers, and the like. A number of factors have driven the move to self-propulsion, such as a desire for larger equipment with less effort required to use the equipment. Current self-propulsion systems for walk-behind equipment generally fall into two categories, simple and complex. Each category has limitations and disadvantages.

One type of simple drive system comprises a belt-and-sheave power take-off that drives a pair of wheels. In this system, a motor engages a belt, which extends around a sheave or pulley on an axle attached to the wheels. The motor drives the belt around the pulley producing rotation of the axle. The user engages and disengages this type of drive system by adjusting the tension on the drive belt. Typically, such a drive system is either fully engaged (a taught belt) or fully disengaged (a slack belt). A chief disadvantage of a belt-driven system is that the common axle drives the two connected wheels at the same rate. Because differential rotation between the drive wheels is not permitted, cornering with a piece of equipment having a belt and sheave drive system can be difficult.

More particularly, cornering requires the outer wheel to travel a greater distance than the inner wheel. Because the outer wheel must travel farther than the inner wheel in the same amount of time, the outer wheel must rotate faster than the inner wheel. When the outer and inner wheels are fixed to a common axle, however, this differential rotation is not permitted. The result is that either the inner wheel is driven faster or the outer wheel is driven slower than necessary. In either case, cornering the equipment requires one of the wheels to slip or skid.

Difficulty with cornering and wheel slippage are two major disadvantages with using equipment having drive wheels fixed to a common axle. Additionally, effort by the operator must be provided to overcome the ground-engaging forces to allow one wheel to slip. Furthermore, wheel slippage can cause damage to the surfaces on which the equipment is operating, as well as accelerated tire wear. For instance, turning a lawnmower with this type of drive system damages the turf under the slipping wheel.

Power equipment having more than two wheels can have belt-and-sheave drive systems that drive either a pair of front wheels or a pair of rear wheels. Front wheel drive systems avoid some of the disadvantages of rear wheel drive systems but at the cost of creating other disadvantages. Using a typical four-wheeled, walk-behind lawnmower as an example, cornering effort decreases and wheel slippage is generally avoided because the user can elevate the front drive wheels by pushing downward on a rearwardly-projecting handle when cornering. This vertically pivots the lawnmower about the rear wheels, lifting the front wheels out of contact with the ground below. Because the drive wheels go out of contact with the ground, the drive wheels can rotate freely while the user turns the lawnmower using the independently-rotating rear wheels.

Two disadvantages to front wheel drive systems, however, are that damage to the ground's surface and accelerated tire wear can occur when the drive wheels abruptly re-engage the ground. Another disadvantage is that the front drive wheels can lose traction due to the weight of the equipment shifting as it is pushed up a hill. Because the user's effort greatly increases when pushing a piece of equipment uphill, this is a time that the user particularly needs the drive system to propel the equipment.

Other examples of simple drive systems used on self-propelled, walk-behind equipment are wheel-on-wheel drive systems that drive one or more wheels. Wheel-on-wheel drive systems are similar to belt-and-sheave drive systems. The difference is that the ground-engaging drive wheels are driven by one or more power transfer wheels instead of a belt. When the user engages the drive system, the transfer wheels engage the ground-engaging wheels. If a single transfer wheel is used, a common axle connects the ground-engaging wheels. A wheel-on-wheel drive system, however, has the same disadvantages as the belt-and-sheave drive systems, i.e., increased turning effort, slippage, damage to surface of ground, accelerated tire wear and/or loss of traction.

Complex drive systems for self-propelled, walk-behind power equipment generally provide a differential between the pair of drive wheels. The differential permits independent or differential rotation of the drive wheels on an axle when the user corners. The major disadvantages of complex drive systems are that they are more expensive and heavier than simple systems.

SUMMARY OF THE INVENTION

The present invention relates to an overrunning clutch for use with a wheel that generally has a small diameter, i.e., less than 24 inches and, more preferably, less than 16 inches. The wheel preferably operates at a speed of less than approximately 1000 RPM. The clutch is mounted within the plastic hub of each wheel that is mounted on a common drive axle, and permits differential rotation of the wheels. The overrunning clutch according to the present invention can particularly be used with ground-engaging wheels on walk-behind, power-driven equipment.

The overrunning clutch includes a housing that is mounted within the hub of the wheel and which has a radial stiffness that accommodates the torque being transmitted from the axle to the wheel, without relying on additional stiffness from the wheel hub. The housing has a generally annular cross-section with an outer periphery and an inner periphery. The inner periphery has a plurality of recesses spaced equidistantly thereabout. Each recess has a radial throat opening, a radially outer wall having a substantially flat surface, a first side wall, and a second side wall. A roller bearing is located in each of the recesses. The second side wall preferably includes a concave surface.

A spring is carried by the first side wall of each of the recesses and biases the roller bearing toward the second side wall. The outer periphery of the housing is preferably knurled to provide a mechanical interlock with the plastic hub of the small diameter wheel.

For a better understanding of the invention, its advantages and the specific objects obtained by its uses, reference should be made to the accompanying drawings and detailed description which illustrate preferred embodiments of the invention.

BRIEF DESCRIPTION OF THE DRAWINGS

For the purpose of illustrating the invention, the drawings show a form of the invention which is presently preferred. However, it should be understood that this invention is not limited to the precise arrangements and instrumentalities shown in the drawings.

DETAILED DESCRIPTION OF THE DRAWINGS

Figure 1:
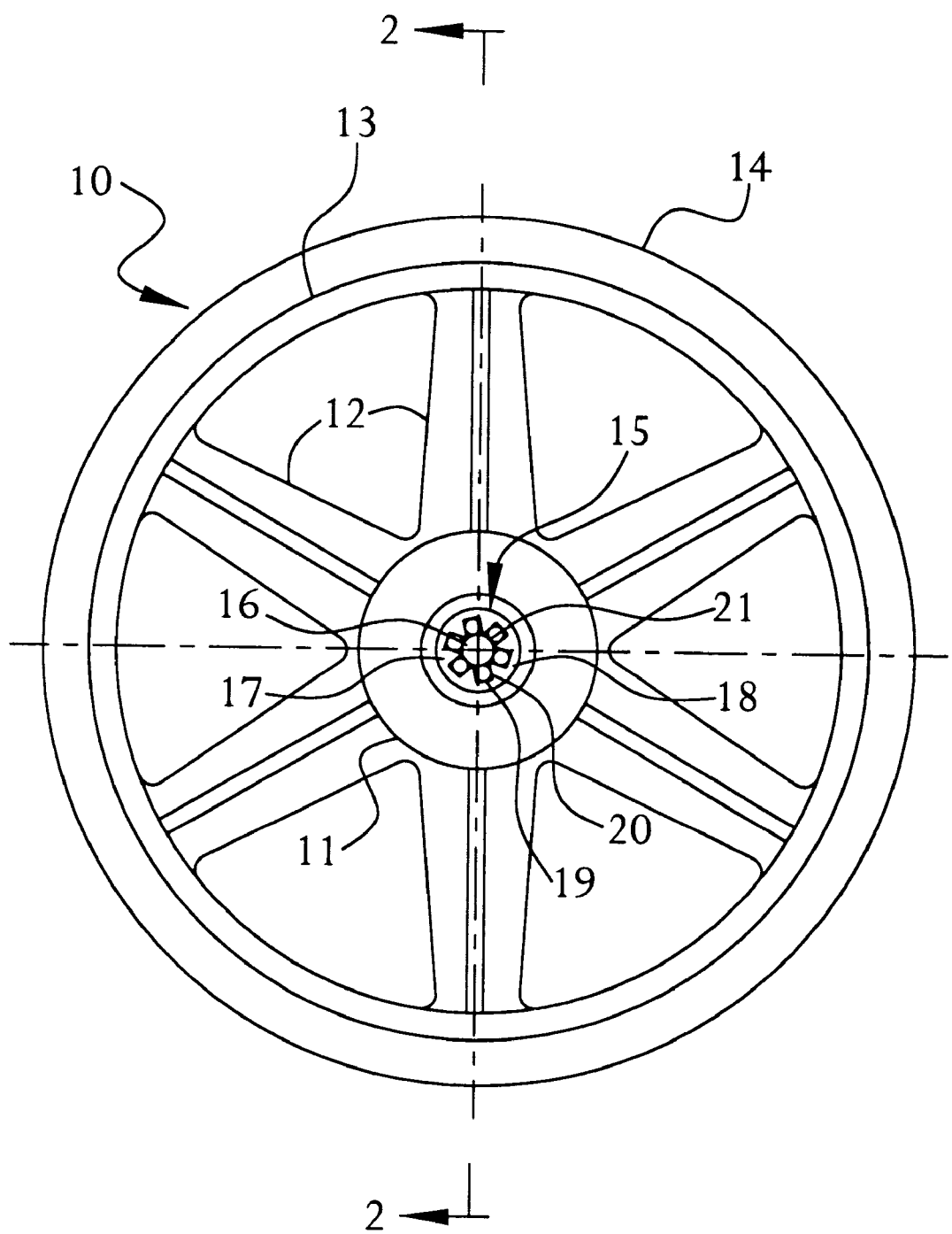
FIG. 1 is a front view of a small diameter wheel which includes the overrunning clutch assembly of the present invention.

Referring to the drawings, wherein like numerals indicate like elements, FIG. 1 illustrates a small diameter wheel 10 that incorporates an overrunning clutch assembly 15 according to the invention. The wheel 10 shown is of typical construction and includes a hub 11, spokes 12, a rim 13, and a tire 14. The spokes 12 project radially from the hub 11 and support the rim 13. The tire 14 is mounted on the rim 13. Typically, the hub 11, spokes 12, and rim 13 are formed as a unit, such as by an injection molding process, and can be made from any suitable plastic material. The tire 14 is commonly composed of a rubber compound. Other materials, however, may be substituted. It should be noted that the invention is not limited to use in a spoked wheel. For instance, a wheel having a flat plate in place of spokes can be used with the present invention.

The overrunning clutch assembly 15 is mounted within the hub 11 of the wheel 10. The clutch assembly 15 has a clutch housing 17 with a plurality of recesses 18 formed in the clutch housing 17. A roller bearing 19 and a spring 20 are located within each recess 18.

The small diameter wheel 10 is adapted to be mounted on an axle 16. More particularly, the axle 16 is disposed within and/or projects through a central opening in the clutch housing 17. The central opening defines a passageway 21 through the housing 17.

Figure 2:
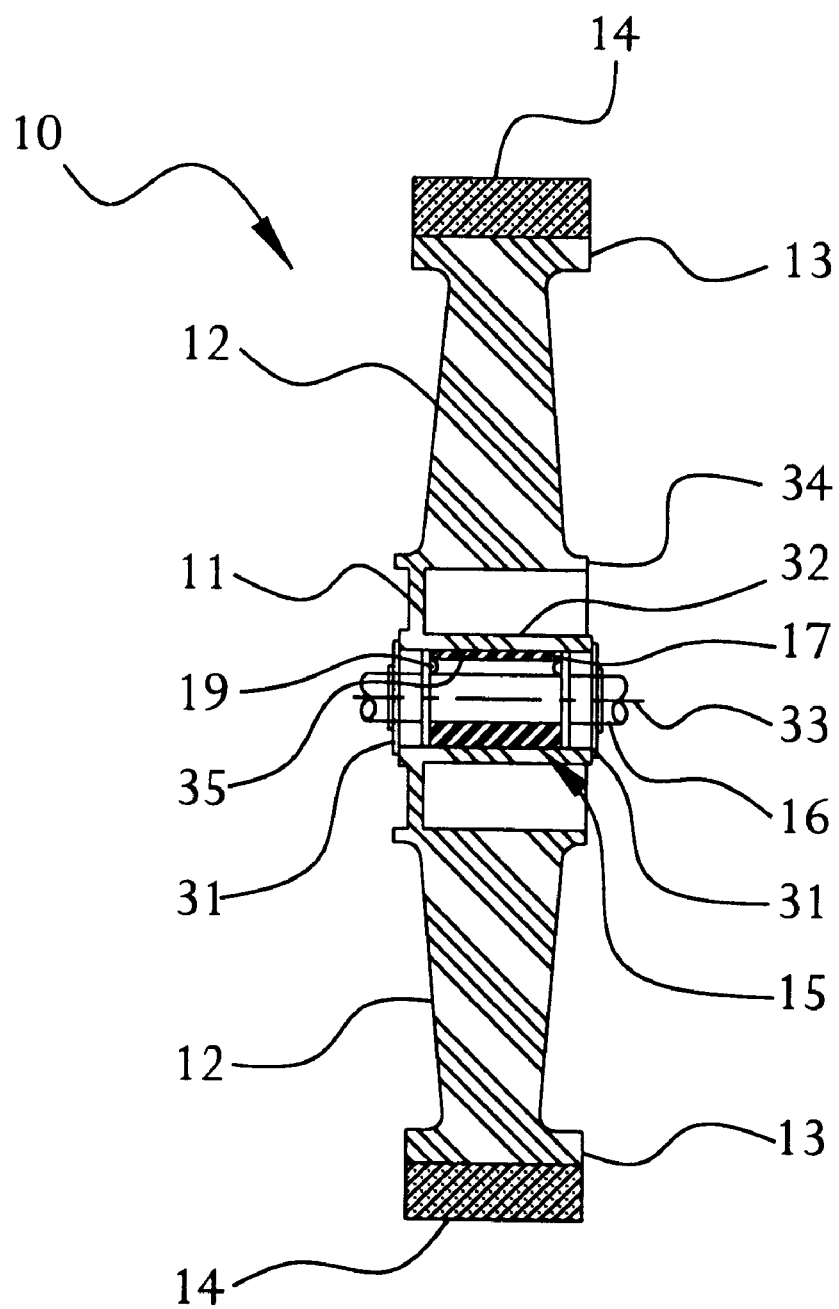
FIG. 2 is a cross-sectional view of the small diameter wheel and overrunning clutch assembly of the present invention taken along line 2—2 of FIG. 1.

Reference now is made to FIG. 2 which shows a section along line 2—2 through the small diameter wheel 10 shown in FIG. 1. A hub wall 32 defines a passageway 35 through the hub 11. The hub wall 32 is preferably annular in shape with a center axis that is collinear with the rotational axis 33 of the wheel 10.

A pair of wheel bearing assemblies 31 rotatably mount the wheel 10 to the axle 16. The bearing assemblies 31 are mounted on opposite ends of the hub 11 and are secured to the wheel 10 through any conventional means known to those skilled in the art, such as by being press fit into the passageway 35. The clutch assembly 15 is located within passageway 35 and between the bearing assemblies 31. The combined assembly of the wheel 10, clutch assembly 15, and wheel bearings 31 is rotatably mounted on the axle 16 about a rotational axis 33.

The clutch assembly 15 is attached to the hub wall 32 through any conventional means such as a press fit attachment. The surface of the clutch housing 17 is preferably knurled to provide a mechanical interlock between the clutch housing 17 and the inside wall of the hub wall 32. Other types of attachment are contemplated in the present invention, such as a splined attachment or by providing a non-circular clutch housing 17 that engages a similarly shaped hub wall 32.

Figure 3:
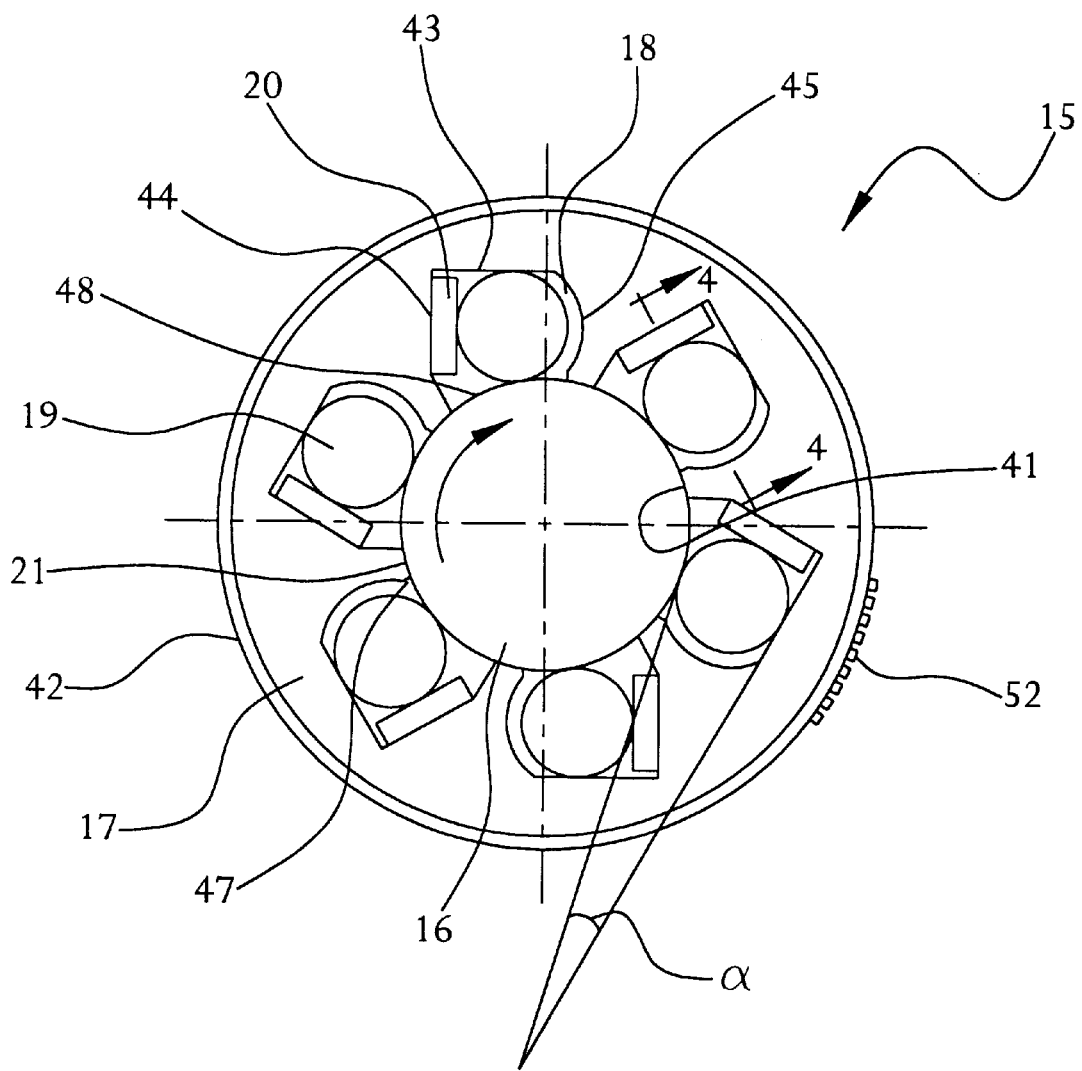
FIG. 3 is an enlarged view of the overrunning clutch according to the present invention.

FIG. 3 shows an enlarged view of the clutch assembly 15 of the present invention. The clutch housing 17 preferably has a generally annular cross-section with an outer periphery 42 and an inner periphery 41. The inner periphery 41 defines a passageway 21 through which the axle 16 passes. The inner periphery 41 of the housing 17 has a radius that is larger than the radius of the axle 16. As discussed above, the outer periphery 42 of the housing 17 preferably has a knurled surface 52 having approximately 0.03 inch deep knurls spaced substantially equidistantly around the surface of the housing 17 for engaging the hub wall 32 shown in FIG. 2.

The clutch assembly 15 has a plurality of recesses 18 formed in the housing 17. Each recess 18 has a throat 48 opening on the inner periphery 41. Each recess 18 also has a radially outer wall 43 substantially opposite the throat 48. The outer wall 43 is preferably a substantially flat surface. Each recess 18 also has a first side wall 44 and a second side wall 45. The second side wall 45 preferably has a concave surface which forms a lip 47 at the inner periphery 41.

The overrunning clutch assembly 15 includes a plurality of roller bearings 19. One roller bearing 19 is located in each of the recesses 18. The roller bearing 19 has a diameter that is configured to engage the flat surface of the outer wall 43 of the recess 18 and the circumference of the axle 16 when the roller bearing 19 is adjacent to the second side wall 45. As will be discussed in more detail below, the recess 18 is configured such that when the roller bearing 19 is adjacent to the first side wall 44, the roller bearing 19 does not engage both the outer wall 43 of the recess 18 and the circumference of the axle 16 at the same time.

The radial height of the first side wall 44 is greater than the radial height of the second side wall 45. As such, the outer wall slopes. The angle formed by the tangent of the roller bearing 19 at the point where the roller bearing 19 contacts the axle 16 and the tangent of the roller bearing 19 at the point where the roller bearing 19 contacts the outer wall 43 is called the wedge angle α. In the present invention, the range for the wedge angle α is from about 5° to about 20°, with a preferred wedge angle a being about 11°.

Figure 4:
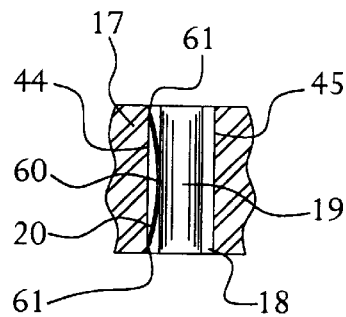
FIG. 4 is cross-sectional view rotated 90° of one of the recesses within the housing of the overrunning clutch of the present invention taken along line 4—4 of FIG. 3.

FIG. 4 shows a cross-sectional view of one of the recesses 18 of the clutch assembly 15 taken along line 4—4 of FIG.

3. The roller bearing 19 is shown in the recess 18 between the first side wall 44 and second side wall 45. Each recess 18 has a spring 20 to bias the roller bearing 19 toward the concave second side wall 45 of the recess 18. In a preferred embodiment, the spring 20 is a stainless steel flat spring having an arcuate shape wherein the ends 61 of the spring 20 are positioned against the first side wall 44. The center 60 of the spring 20 engages the roller bearing 19 and urges the roller bearing 19 toward the second side wall 45.

Figure 5:
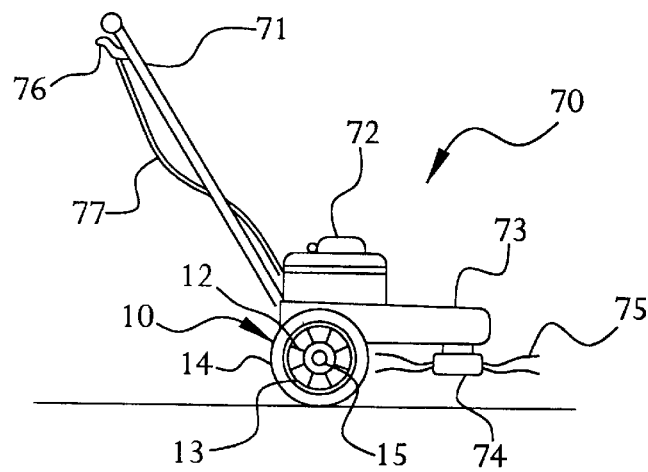
FIG. 5 is a side view of a self-propelled flexible line trimmer utilizing the overrunning clutch of the present invention.

FIG. 5 shows a flexible line trimmer 70 that incorporates the present invention. The flexible line trimmer 70 generally includes a body 73, a power unit 72, a handle 71, a pair of laterally spaced-apart, ground-engaging wheels 10, and one or more flexible chord pieces 75 mounted to a rotatable trimmer head 74. The wheels 10 are mounted to the body 73 near the rear of the body 73. Each wheel 10 includes spokes 12, rim 13, tire 14, and clutch assembly 15. It should be noted, that many self-propelled walk-behind devices, such as lawnmowers, lawn vacuums, snow blowers, concrete cutting machines, and the like have more than two wheels. Furthermore, each wheel 10 having the clutch assembly 15 therein is freely interchangeable. For instance, a wheel 10 mounted on a drive axle near the rear of the body 73 can be mounted to either side of the drive axle.

The power unit 72 drives both the rotatable trimmer hub 74 and the wheels 10. The power unit 72 may be a gasoline-fueled internal combustion engine. The handle 71 of the flexible line trimmer 70 projects rearwardly and upwardly from the rear end of the body 73. Attached to the handle is a drive system control lever 76 for selectively engaging and disengaging the self-propulsion system 80 (shown in more detail in FIG. 6). A drive system control cable 77 connects the control lever 76 to the self-propulsion system 80.

Figure 6:
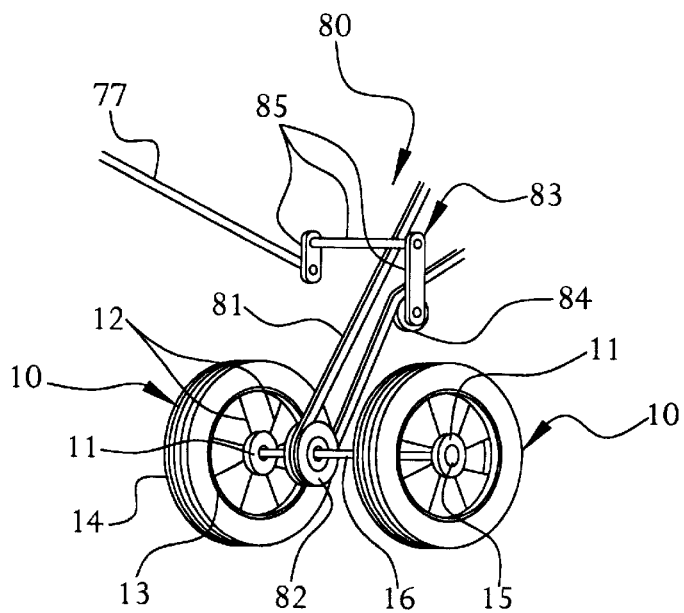
FIG. 6 is an enlarged view of a belt-and-sheave drive self-propulsion system of the flexible line trimmer of FIG. 5 utilizing the overrunning clutch of the present invention.

Referring now to FIG. 6, an isometric view of the self propulsion system 80 of the flexible line trimmer 70 of FIG. 5 is shown. The self-propulsion system 80 generally comprises a belt 81, a sheave 82, and a belt tensioning mechanism 83. The power unit or motor 72 of the flexible line trimmer 70 shown in FIG. 5 drives the belt 81. The belt 81, when properly tensioned, drives the sheave 82. The sheave 82 is rigidly attached to the axle 16. Thus, when the belt is driven it rotates the axle 16 and, ultimately, the laterally spaced apart wheels 10. The belt tensioning mechanism 83 preferably includes a plurality of linkages 85 and a roller 84. Control cable 77 actuates the tensioning mechanism 83 and selectively puts the belt 81 into tension or relaxation. The belt tensioning mechanism 83 uses the linkages 85 to adjust the position of the roller 84, which is in contact with belt 81. Movement of the roller 84 toward the belt 81 causes the path of the belt 81 to lengthen. The increased path length stretches the belt 81, thus tensioning it. Movement of the roller 84 away from the belt 81 shortens the path of the belt 81, thereby relaxing the belt. One wheel 10 is mounted onto and at each end of the axle 16 with the wheel bearings and clutch assembly 15 as described above.

Using the flexible line trimmer 70 shown in FIG. 5 as an example, the following is a description of how the wheel 10 and clutch assembly 15 of the present invention works in conjunction with a self-propelled, manually guided piece of power equipment.

When the user wishes to use the self propulsion system of the flexible line trimmer 70, the user engages the drive system 80 by moving the control lever 76 to the engaging position. The control lever 76 actuates control cable 77, which in turn actuates the linkages 85 of the belt tensioning mechanism 83. The belt tensioning mechanism 83 moves the roller toward the belt 81, putting the belt 81 into tension. The tension in the drive belt 81 causes sufficient friction between the drive belt 81 and the sheave 82 to drive the sheave 82 and the axle 16 to which the sheave 82 is fixedly attached. As shown, the belt 81 drives the axle 16 and wheels 10 in the clockwise direction. The driven rotation of wheels 10 propels the flexible line trimmer 70 forward.

Referring to FIG. 3 for explanation of the operation of the clutch assembly 15 in conjunction with the drive system 80, the clockwise rotation of axle 16 and wheel 10 corresponds to a clockwise rotation of axle 16 and clutch assembly 15 as shown in FIG. 3. The driven clockwise rotation of the axle 16, in conjunction with the biasing force of the spring 20, cause each roller bearing 19 to move toward the second side wall 45 until each roller bearing 19 engages both the circumference of the axle 16 and the radially outerwall 43 of the recess 18. When the roller bearings 19 engage both the radially outer walls 43 and the axle 16, the clutch housing 17 is driven in the clockwise direction by the axle 16. The clutch housing 17 is attached to the wheel 10 and drives the wheel 10, propelling the flexible line trimmer 70 forward.

Cornering the flexible line trimmer 70 with the drive system 80 engaged is accomplished easily with the small diameter wheel 10 and clutch assembly 15 of the present invention since the clutch assembly 15 permits each wheel 10 to disengage and overrun the axle 16. Overrunning allows the outer wheel 10 to turn faster than the inner wheel 10 while cornering.

The clutch assembly 15 permits the wheel 10 to overrun the axle 16 in the following manner. When the wheel 10 is driven faster than, or overruns, the axle 16, the roller bearing 19 in each recess 18 is forced against the spring 20. As the spring 20 compresses, the roller bearing 19 moves toward the first side wall 44 and away from the axle 16. As such, the wheel 10 becomes disengaged from the axle and is free to rotate independently from the axle and at a different speed than the inner wheel.

In a preferred embodiment for use in, for instance, a small diameter wheel 10 of a walk-behind, self-propelled lawnmower, the clutch housing 17 is made of stainless steel and includes six recesses 18 spaced equidistantly about the inner periphery 41. Each roller bearing 19 preferably has a diameter of 3/16 inch and is made of stainless steel. The minimum thickness of the housing 17, measured between the inner and outer peripheries 41, 42, is preferably about ¼ inch. This thickness gives the steel clutch 15 sufficient radial stiffness such that the clutch 15 can transmit operating torque from the axle to the wheel without deforming (i.e., without requiring radial support from the hub 11). Although steel is the preferred material for the housing 17 and the roller bearings 19, other material, such as high strength plastic and aluminum may be used depending on the torque being transmitted and the housing configuration. Corrosion and erosion resistant materials are preferred because of the corrosive and erosive environments in which the clutch 15 may operate. For instance, in the case of a lawnmower, the clutch 15 may be exposed to moisture, lawn treatment chemicals, soil, sand, and the like. The elements can degrade the components of the clutch if they are not made from the appropriate materials.

Each spring 20 in the preferred embodiment is an arcuate single leaf spring, which is made of stainless steel and has a thickness of 0.01 inch. Although stainless steel is the preferred material for the spring 20, other materials such as plastic may be used. The preferred range of force that the spring 20 exerts on the roller bearing 19 is about 0.3 pounds to about 0.5 pounds. The spring force is chosen based on the operating speed of the clutch and the environment in which the spring 20 must operate. For the relatively low operating speed of the clutch 15 of the present invention, i.e., below approximately 1000 RPM, a relatively stiff spring 20 is required. That stiffness is needed to bias the roller bearing 19 toward the second side wall 45, since the speed of the axle 16 does not provide sufficient frictional force to maintain the roller bearing 19 in the wedged position. In addition, a relatively stiff spring 20 is needed to bias the roller bearing 19 in the wedged position in the presence of cold, thick grease, which may also contain soil, sand, and other contaminants from the environment in which the clutch 15 operates.

The following is a table of the preferred clutch dimensions according to the present invention for various nominal axle 16 diameters. The dimensions shown are for clutches 15 having six recesses 18 and six ³⁄₁₆ inch diameter rollers, as described above. If materials other than those of the preferred embodiment are used, dimensions of the housing 17, rollers 19, and spring 16 may need to be adjusted depending on the properties of the material chosen.

| Nominal Shaft Diameter (Inches) | Clutch Outside Diameter (Inches) | Nominal Clutch Width (Inches) |
| --- | --- | --- |
| ¼ | 1-⅛ | 1-½ |
| ⅜ | 1-⅛ | 1-½ |
| ½ | 1-⅛ | 1-½ |
| ⅝ | 1-⅛ | 1-½ |
| ¾ | 1-⅜ | 1-½ |
| 1 | 1-½ | 1-½ |

The above described preferred embodiment is designed for use in wheels 10 that have an outside diameter of less than 24 inches and, more preferably, less than 16 inches, and which operate below about 1000 RPM. Specifically, the preferred embodiment is designed to be easily mounted in the hubs 11 of standard, commonly available small diameter plastic wheels 10. The size and number of the recesses 18 are determined to permit the use of ³⁄₁₆ inch diameter hardened steel roller bearings 19 which, when spaced about the clutch housing 17, adequately transmit torque from the axle 16 to the wheel 10. In addition, the preferred embodiment is designed for use with wheels 10 having hubs 11 that cannot provide sufficient restraint against deformation of a clutch housing 17 mounted therein when the clutch 15 is engaged. An example of such a hub is a relatively thin plastic hub that is commonly used on walk-behind lawn-care equipment and the like.

Prior art clutches which were mounted within metal wheels utilized thin clutch housings to contain the roller bearings. During operation, the torque applied to the clutch housing would cause the thin housing to deform. The metal hub of the wheel provided the necessary support to prevent deformation of the clutch housing. If a prior art clutch were mounted within a plastic wheel hub, however, it would not be able to generate the necessary torque. The plastic hub could not provide sufficient radial support to prevent deformation of the housing. Rather, the relatively thin housing of the prior art clutches would deform excessively as the roller bearings attempt to become wedged between an axle and the housing. The deformation of the housing would prevent the roller bearings from engaging with the clutch housing and the axle. The present invention overcomes these problems with the prior art clutch designs by providing a housing 17 having sufficient stiffness to prevent deformation.

In addition to allowing easy cornering when the drive system 80 is engaged, the overrunning clutch assembly 15 according to the present invention also prevents the wheels 10 from rolling backwards when the engine 72 is off and the drive system 80 is engaged.

Although the invention has been described and illustrated with respect to the exemplary embodiments thereof, it should be understood by those skilled in the art that the foregoing and various other changes, omissions and additions may be made therein and thereto, without parting from the spirit and scope of the present invention.

I claim:

1. A freely interchangeable small diameter wheel adapted to rotate at less than 1000 RPM, the small diameter wheel comprising:

a hub having an inner wall defining an aperture extending through the hub; and an overrunning clutch having a housing disposed completely within the hub portion of the wheel and extending substantially the entire length of the inner wall, the housing having a generally annular cross-section with an outer periphery and an inner periphery defining a passageway therethrough, the housing having a plurality of recesses spaced equidistantly thereabout, the recesses each having:

a throat opening;

a first side wall extending outward from the inner periphery and having a predetermined height;

a second side wall extending outward from the inner periphery and having predetermined height less than the predetermined height of the first side wall;

a substantially flat outer wall connecting the radially outer end of the first side wall to the radially outer end of the second side wall and sloping toward the inner periphery;

a roller bearing disposed in each recess, the roller bearing having a diameter greater than the height of the second side wall; and a biasing means for engaging the roller bearing and biasing the roller bearing toward the second side wall of the recess.

2. The small diameter wheel of claim 1, wherein six recesses are spaced equidistantly about the inner periphery.

3. The freely interchangeable small diameter wheel of claim 1, wherein the biasing means is a spring disposed between the first side wall and the roller bearing.

4. The small diameter wheel of claim 3, wherein the first side wall is flat and wherein the spring is a flat spring having an arcuate shape, the center of the spring is in contact with the center of the length of the roller bearing, and the ends of the spring are in contact with the first side wall.

5. The freely interchangeable small diameter wheel of claim 1, wherein the outer periphery has a knurled surface, the knurled surface mechanically engaging the a hub portion of the small diameter wheel.

6. The freely interchangeable small diameter wheel of claim 1, wherein the second side wall is substantially concave.

7. The freely interchangeable small diameter wheel of claim 1, wherein the angle formed by the tangent of the roller bearing at the point where the roller bearing contacts the axle and the tangent of the roller bearing at the point where the roller bearing contacts the outer wall defines a wedge angle in a range from about 5° to about 20°.

8. The freely interchangeable small diameter wheel of claim 7, wherein the wedge angle is about 11°.

9. A drive train in a self-propelled device comprising:
a drive axle having a first end and a second end, the axle adapted to be rotated at a speed less than 1000 RPM, the axle having an axis of rotation;
at least one interchangeable wheel disposed about the drive axle, the at least one wheel having an axis of rotation that is co-linear with the axis of rotation of the drive axle, the wheel having a hub portion; and
an overrunning clutch disposed within the hub portion of the at least one wheel and engaged with the drive axle during normal operation for transmitting torque from the axle to the hub portion, the overrunning clutch including a housing disposed substantially within the hub portion of the at least one wheel, the housing having a radial stiffness which prevents deformation of the clutch housing when the drive axle transmits torque to the hub, the housing having a generally annular cross-section with an outer periphery and an inner periphery defining a passageway therethrough in which the first end of the axle is located, the housing having a plurality of recesses spaced equidistantly thereabout, the recesses each having:
a radial throat opening;
a first side wall extending outwardly from the inner periphery and having a predetermined height;
a second side wall extending outwardly from the inner periphery and having a predetermined height less than the predetermined height of the first side wall;
a substantially flat outer wall that connects the radially outer end of the first side wall to the radially outer end of the second side wall while sloping toward the inner periphery;
a roller bearing disposed in each of the recesses, the roller bearing having a diameter greater than the height of the second side wall; and
a biasing means for engaging the roller bearing and biasing the roller bearing toward the second side wall of the recess;
the overrunning clutch mounted to the wheel hub portion so as to permit the wheel and clutch to be removable from the drive axle as a combination.

10. The drive train of claim 9, wherein there are six recesses spaced equidistantly about the inner periphery.

11. The drive train of claim 9, wherein the biasing means is a spring disposed between the first side wall and the roller bearing.

12. The drive train of claim 11, wherein the first side wall is flat and wherein the spring is a flat spring having an arcuate shape, the center of the spring is in contact with the center of the length of the roller bearing, and the ends of the spring are in contact with the first side wall.

13. The drive train of claim 9, wherein the outer periphery has a knurled surface, the knurled surface mechanically engaging a hub portion of the wheel.

14. The drive train of claim 9, wherein the second side wall is substantially concave.

15. The drive train of claim 9, wherein the angle formed by the tangent of the roller bearing at the point where the roller bearing contacts the axle and the tangent of the roller bearing at the point where the roller bearing contacts the outer wall defines a wedge angle in a range from about 5° to about 20°.

16. The drive train of claim 15, wherein the wedge angle is about 11°.

17. The drive train of claim 9, further comprising a second wheel and a second overrunning clutch, wherein the second clutch is fixedly disposed substantially within the second wheel and located at the second end of the axle in spaced-apart relation with the first wheel.

18. The drive train of claim 9, wherein the self-propelled device is a push-type device that includes a power-driven tool and a power unit, and wherein the power unit drives both the drive train and the tool.

19. An interchangeable small diameter wheel assembly for mounting to an axle on a power device, the axle operating at less than 1000 RPM, the small diameter wheel comprising:
a circumferential ground-engaging portion;
a hub having a cylindrically-walled portion which has an inside wall, a first open end, and a second open end, the cylindrically-walled portion being concentric with the ground-engaging portion and defining a first passageway therethrough;
a means for connecting the ground engaging portion to the hub portion;
a first wheel bearing and a second wheel bearing; and
an overrunning clutch having a steel housing which has a generally annular cross-section with a knurled outer periphery and an inner periphery defining a second passageway therethrough in which an axle is located, the housing having a thickness of about ¼ inch between the inner and outer peripheries and having six recesses spaced equidistantly thereabout, the recesses each having:
a throat opening;
a substantially flat first side wall extending outward from the inner periphery and having a predetermined height;
a concave second side wall extending outward from the inner periphery and having predetermined height less than the predetermined height of the first side wall;
a steel roller bearing disposed in each recess, the roller bearing having a diameter of about 3/16 inch;
a substantially flat outer wall connecting the radially outer end of the first side wall to the radially outer end of the second side wall and sloping toward the inner periphery, wherein the angle formed by the tangent of the roller bearing at the point where the roller bearing contacts the axle and the tangent of the roller bearing at the point where the roller bearing contacts the outer wall defines a wedge angle greater than 10°; and
an arcuate flat steel spring having a thickness of about 0.01 inch for engaging the roller bearing and biasing the roller bearing toward the second side wall of the recess, the spring having a center, a first end, and a second end, the first end and second end engaging the first side wall and the center engaging the roller bearing;
wherein the overrunning clutch is located in the first passageway and is secured to the cylindrically-walled portion by mechanical engagement of the knurled outer periphery with the inside wall, and wherein the first wheel bearing is located at the first end of the cylindrically-walled portion and the second wheel bearing is located at the second end of the cylindrically-walled portion.

20. A drive train in a self-propelled device comprising:
drive axle having a first end and a second end and an axis of rotation;
a first wheel disposed about the first end of the axle, the first wheel including a hub portion and having an axis of rotation that is co-linear with the axis of rotation of the axis;

a first overrunning clutch mounted to the hub portion of the wheel and engaged with the axle during normal operation for transmitting torque from the axle to the hub portion, the overrunning clutch including a housing mounted to the hub portion of the wheel, the housing having a generally annular cross-section with an outer periphery and an inner periphery defining a passageway therethrough in which the first end of the axle is located, the housing having a plurality of recesses spaced equidistantly thereabout, the recesses each having:

a radial throat opening, a first side wall extending outwardly from the inner periphery and having a predetermined height, a second side wall extending outwardly from the inner periphery and having a predetermined height less than the predetermined height of the first side wall, a substantially flat outer wall that connects the radially outer end of the first side wall to the radially outer end of the second side wall while sloping toward the inner periphery;

a roller bearing disposed in each of the recesses, the roller bearing having a diameter greater that the height of the second side wall, and a biasing means for engaging the roller bearing and biasing the roller bearing toward the second side wall of the recess; and a second wheel mounted to the second end of the drive axle, the second wheel having an axis of rotation that is co-linear with the axis of rotation of the drive axle and the first wheel.

21. A freely interchangeable small diameter wheel assembly for mounting to an axle on a power device, the axle operating at less than 1000 RPM, the small diameter wheel comprising:

a circumferential ground-engaging portion;

a hub mounted to the circumferential ground-engaging portion, the hub having an inner wall which defines an innermost diameter of the hub; and an overrunning clutch located mounted to and located radially inward from the inner wall, the clutch having a housing that has an outer periphery engaged with the inner wall of the hub, the clutch also has an inner periphery defining a passageway adapted to receive an end of an axle, the housing having a plurality of recesses formed in it, each recess having:

a roller disposed in the recess, the roller adapted to move within the recess from a non-locking position to a locking position, the clutch adapted to transmit torque between the axle and the housing in the locking position, the non-locking position permitting free-rotation of the housing with respect to the axle, and a spring mounted within the recess and adapted to bias the roller bearing into the locking position.

22. A small diameter wheel assembly according to claim 21 further comprising at least one bearing located within the aperture, the bearing having an inner race engaged with the axle and an outer race engaged with the inner wall of the hub.

23. A small diameter wheel assembly according to claim 21 further comprising an axle having a first end located within the inner periphery of the housing and rotatably attached to the hub.

24. A freely interchangeable small diameter wheel assembly according to claim 21 further comprising at least one protector disposed about the axle immediately adjacent to the housing.

25. A freely interchangeable small diameter wheel according to claim 1 wherein the hub is made from plastic.

26. A drive train according to claim 9 wherein the hub portion is made from plastic.

27. An interchangeable small diameter wheel according to claim 19 wherein the hub is made from plastic.

28. A drive train in a self-propelled device comprising:

a drive axle having a first end and a second end, the axle adapted to be rotated at a speed less than 1000 RPM, the axle having an axis of rotation;

a first wheel disposed about a first end of the drive axle, the first wheel having an axis of rotation that is co-linear with the axis of rotation of the drive axle, the wheel having a hub portion;

a first overrunning clutch disposed within the hub portion of the first wheel and engaged with the drive axle during normal operation for transmitting torque from the axle to the hub portion, the overrunning clutch including a housing disposed substantially within and mounted to the hub portion of the first wheel, the housing having a radial stiffness which prevents deformation of the clutch housing when the drive axle transmits torque to the hub, the housing having a generally annular cross-section with an outer periphery and an inner periphery defining a passageway therethrough in which the first end of the axle is located, the housing having a plurality of recesses spaced equidistantly thereabout, the recesses each having:

a radial throat opening;

a first side wall extending outwardly from the inner periphery and having a predetermined height;

a second side wall extending outwardly from the inner periphery and having a predetermined height less than the predetermined height of the first side wall;

a substantially flat outer wall that connects the radially outer end of the first side wall to the radially outer end of the second side wall while sloping toward the inner periphery;

a roller bearing disposed in each of the recesses, the roller bearing having a diameter greater than the height of the second side wall; and a biasing means for engaging the roller bearing and biasing the roller bearing toward the second side wall of the recess;

a second wheel disposed about a second end of the drive axle, the second wheel having an axis of rotation that is co-linear with the axis of rotation of the drive axle, the second wheel having a hub portion; and a second overrunning clutch disposed within the hub portion of the second wheel and engaged with the drive axle during normal operation for transmitting torque from the axle to the hub portion, the overrunning clutch including a housing disposed substantially within and mounted to the hub portion of the second wheel, the housing having a radial stiffness which prevents deformation of the clutch housing when the drive axle transmits torque to the hub, the housing having a generally annular cross-section with an outer periphery and an inner periphery defining a passageway therethrough in which the second end of the axle is located, the housing having a plurality of recesses spaced equidistantly thereabout, the recesses each having:

a radial throat opening;

a first side wall extending outwardly from the inner periphery and having a predetermined height;

a second side wall extending outwardly from the inner periphery and having a predetermined height less than the predetermined height of the first side wall;

a substantially flat outer wall that connects the radially outer end of the first side wall to the radially outer end of the second side wall while sloping toward the inner periphery;

a roller bearing disposed in each of the recesses, the roller bearing having a diameter greater than the height of the second side wall; and a biasing means for engaging the roller bearing and biasing the roller bearing toward the second side wall of the recess;

the first and second overrunning clutches being mounted to the respective wheel hub portions so as to permit each wheel and respective clutch to be removable from the drive axle as a combination.

29. A freely interchangeable small diameter wheel assembly for mounting to an axle on a power device, the axle operating at less than 1000 RPM, the small diameter wheel comprising:

a hub having an inner wall which defines an innermost diameter of the hub; and an overrunning clutch mounted to the hub, the clutch having a housing that has an outer periphery engaged with the inner wall of the hub, the clutch also has an inner periphery defining a passageway adapted to receive an end of an axle, the housing having a plurality of recesses formed in it, each recess having:

a roller disposed in the recess, the roller adapted to move within the recess from a non-locking position to a locking position, the clutch adapted to transmit torque between the axle and the housing in the locking position, the non-locking position permitting free-rotation of the housing with respect to the axle, and a spring mounted within the recess and adapted to bias the roller bearing into the locking position;

the overrunning clutch being mounted to the hub such that rollers define a combined inner diameter which is radially inward from the inner wall of the hub.

30. A freely interchangeable small diameter wheel assembly for mounting to an axle on a power device, the axle operating at less than 1000 RPM, the small diameter wheel comprising:

a hub mounted having an inner wall which defines an innermost diameter of the hub; and an overrunning clutch having a housing that has an outer periphery engaged with the inner wall of the hub, the housing being located substantially in the center of the length of the inner wall, the clutch also has an inner periphery defining a passageway adapted to receive an end of an axle, the housing having a plurality of recesses formed in it, each recess having:

a roller disposed in the recess, the roller adapted to move within the recess from a non-locking position to a locking position, the clutch adapted to transmit torque between the axle and the housing in the locking position, the non-locking position permitting free-rotation of the housing with respect to the axle, and a spring mounted within the recess and adapted to bias the roller bearing into the locking position.

31. A freely interchangeable small diameter wheel assembly for mounting to an axle on a power device, the axle operating at less than 1000 RPM, the small diameter wheel comprising:

a hub mounted having an inner wall which defines an innermost diameter of the hub, the hub having a width along the inner wall; and an overrunning clutch having a housing with an outer periphery engaged with the inner wall of the hub, the housing extending substantially the entire hub width, the clutch also has an inner periphery defining a passageway adapted to receive an end of an axle, the housing having a plurality of recesses formed in it, each recess having:

a roller disposed in the recess, the roller adapted to move within the recess from a non-locking position to a locking position, the clutch adapted to transmit torque between the axle and the housing in the locking position, the non-locking position permitting free-rotation of the housing with respect to the axle, and a spring mounted within the recess and adapted to bias the roller bearing into the locking position.

32. A drive train in a self-propelled device comprising:

a drive axle having a first end and a second end, the axle adapted to be rotated at a speed less than 1000 RPM, the axle having an axis of rotation;

a first wheel disposed about a first end of the drive axle, the first wheel having an axis of rotation that is co-liner with the axis of rotation of the drive axle, the wheel having a hub portion;

a first overrunning clutch disposed within the hub portion of the first wheel and engaged with the drive axle during normal operation for transmitting torque from the axle to the hub portion, the overrunning clutch including a housing disposed substantially within and mounted to the hub portion of the first wheel, the housing having a radial stiffness which prevents deformation of the clutch housing when the drive axle transmits torque to the hub, the housing having a generally annular cross-section with an outer periphery and an inner periphery defining a passageway therethrough in which the first end of the axle is located, the housing having a plurality of recesses spaced equidistantly thereabout, the recesses each having:

a roller disposed in the recess, the roller adapted to move within the recess from a non-locking position to a locking position, the clutch adapted to transmit torque between the axle and the housing in the locking position, the non-locking position permitting free-rotation of the housing with respect to the axle, and a spring mounted within the recess and adapted to bias the roller bearing into the locking position;

a second wheel disposed about a second end of the drive axle, the second wheel having an axis of rotation that is co-linear with the axis of rotation of the drive axle, the second wheel having a hub portion; and a second overrunning clutch disposed within the hub portion of the second wheel and engaged with the drive axle during normal operation for transmitting torque from the axle to the hub portion, the overrunning clutch including a housing disposed substantially within and mounted to the hub portion of the second wheel, the housing having a radial stiffness which prevents deformation of the clutch housing when the drive axle transmits torque to the hub, the housing having a generally annular cross-section with an outer periphery and an inner periphery defining a passageway therethrough in which the second end of the axle is located, the housing having a plurality of recesses spaced equidistantly thereabout, the recesses each having:

a roller disposed in the recess, the roller adapted to move within the recess from a non-locking position to a locking position, the clutch adapted to transmit torque between the axle and the housing in the locking position, the non-locking position permitting free-rotation of the housing with respect to the axle, and a spring mounted within the recess and adapted to bias the roller bearing into the locking position;

the first and second overrunning clutches being mounted to the respective wheel hub portions so as to permit each wheel and respective clutch to be removable from the drive axle as a combination.

\* \* \* \* \*